United States Patent
Wendler et al.

(10) Patent No.: US 8,040,274 B2
(45) Date of Patent: Oct. 18, 2011

(54) APPARATUS FOR DETERMINING AND/OR MONITORING THE LEVEL OF A MEDIUM

(75) Inventors: Armin Wendler, Freiburg (DE); Qi Chen, Maulburg (DE); Tamas Bartfai, Budapest (HU)

(73) Assignee: Endress + Hauser GmbH + Co. KG, Maulburg (DE)

( * ) Notice: Subject to any disclaimer, the term of this patent is extended or adjusted under 35 U.S.C. 154(b) by 40 days.

(21) Appl. No.: 12/308,937

(22) PCT Filed: Jun. 14, 2007

(86) PCT No.: PCT/EP2007/055905
§ 371 (c)(1),
(2), (4) Date: Sep. 28, 2009

(87) PCT Pub. No.: WO2008/003573
PCT Pub. Date: Jan. 10, 2008

(65) Prior Publication Data
US 2010/0090883 A1    Apr. 15, 2010

(30) Foreign Application Priority Data
Jul. 3, 2006  (DE) .......................... 10 2006 030 965

(51) Int. Cl.
*G01S 13/08* (2006.01)
(52) U.S. Cl. ..................... 342/124; 324/364; 324/637
(58) Field of Classification Search .................. 342/124; 324/64, 637; 73/291, 29 R
See application file for complete search history.

(56) References Cited

U.S. PATENT DOCUMENTS

| 4,371,854 | A | 2/1983 | Cohn | |
|---|---|---|---|---|
| 5,262,743 | A | 11/1993 | Jean | |
| 6,184,818 | B1 * | 2/2001 | Meinel | 342/124 |
| 6,266,022 | B1 * | 7/2001 | Muller et al. | 343/703 |
| 6,284,006 | B1 * | 9/2001 | Siefering et al. | 29/25.01 |
| 2004/0154392 | A1 * | 8/2004 | Reimelt et al. | 73/290 R |
| 2005/0264440 | A1 * | 12/2005 | Smith | 342/124 |
| 2006/0109010 | A1 * | 5/2006 | Edvardsson | 324/644 |

FOREIGN PATENT DOCUMENTS

| DE | 20023063 U1 | 8/2003 |
|---|---|---|
| EP | 1055924 A2 | 11/2000 |
| WO | WO 2006/057599 A1 | 6/2006 |

OTHER PUBLICATIONS

James C. Wiltse, "Recent Developments in Fresnel Zone Plate Antennas at Microwave/Millimeter Wave", Proceedings of SPIE—Conference on Optical Analogies in Microwave/Millimeter-Wave Design, Bd. 3464, Oct. 1, 1998, XP002449132, San Diego, CA.

* cited by examiner

*Primary Examiner* — Thomas Tarcza
*Assistant Examiner* — Timothy A Brainard
(74) *Attorney, Agent, or Firm* — Bacon & Thomas, PLLC

(57) ABSTRACT

An apparatus for ascertaining and/or monitoring fill level of a medium in a container. The apparatus includes an antenna, which transmits and receives high frequency signals in a predetermined oscillatory mode in a bounded space in a predetermined radiation direction, wherein, in front of the antenna in the radiation direction, an antenna protection element of a material transmissive for the high frequency signals is provided, and wherein a control/evaluation unit is provided, which evaluates the received high frequency signals and ascertains the fill level.

14 Claims, 4 Drawing Sheets

APPARATUS FOR DETERMINING AND/OR MONITORING THE LEVEL OF A MEDIUM

TECHNICAL FIELD

The present invention relates to an apparatus for ascertaining and/or monitoring fill level of a medium in a container. The apparatus includes an antenna, which transmits and receives high frequency signals in a predetermined oscillatory mode in a bounded space in a predetermined radiation direction, wherein, in front of the antenna in the radiation direction, an antenna protection element of a material transmissive for the high frequency signals is provided, from a surface of which occurring condensate of the medium runs, and/or drops, off, and wherein a control/evaluation unit is provided, which evaluates the received high frequency signals and ascertains fill level.

BACKGROUND DISCUSSION

One of a number of measuring methods for ascertaining fill level in a container is the travel time, measuring method. In the travel time, measuring method, for example, microwaves, or radar waves, are transmitted via an antenna apparatus, and echo waves reflected on the surface of the medium are received back after the distance dependent, travel time of the measuring signal. From half the travel time, the fill level of the medium in a container can be calculated. The echo curve represents, in such case, the received signal amplitude as a function of time, wherein each measured value of the echo curve corresponds to the amplitude of an echo signal reflected on a surface at a certain distance. The travel time, measuring method is essentially divided into two methods of ascertainment. Time difference measurement is a first method of ascertainment, in which the time required for a broadband, wave, signal pulse to move over a traveled path is ascertained. A further, widely employed method of ascertainment is that wherein the sweep frequency difference between a transmitted, frequency modulated, high frequency signal and the reflected, received, frequency modulated, high frequency signal is ascertained (FMCW—Frequency Modulated Continuous Wave). In the following, there is no limitation to a particular method of ascertainment.

Long used in process measurements technology are group radiator antennas, such as planar antennas or antenna arrays, horn antennas and parabolic antennas. Planar antennas are characterized by compact construction and cost effective manufacture, as compared with other antennas. Conventionally, planar antennas are designed as free field antennas, which usually radiate and receive linearly, or also circularly, polarized waves. Some embodiments of such planar antennas are described, for example, in DE 101 18 009 A1. As printed antenna structures, they differ, in turn, on the basis of their primary HF radiating element in terms of resonant structures, such as e.g. patch, slit, monopole and dipole antennas, and non resonant slit antennas, such as e.g. tapered slit antennas and Vivaldi antennas, as well as combinations of these resonant and non resonant structures. The feeding, or exciting, of the radiating elements occurs, normally, via strip lines (microstrip lines). Other line structures for the feeding of the elements, such as coplanar, and slit, lines, are likewise possible. Through simple photolithographic manufacture as printed circuits, such planar antennas are very suitable for mass production.

Another group of printed antennas, or exciting structures, are those, which produce a certain EM field distribution. As known from EP 1083413 B1, TE01 mode is produced with planar, slit radiators. This mode has for fill level measurements in bypasses and sounding tubes, as hollow conductors, the advantage, that the TE01 mode of the high frequency, measuring signal has, on the basis of its field distribution, very low attenuation and propagates almost uninfluenced by container wall disturbances, such as welded seams and holes. An option is also to work with the fundamental mode TE11 in a round, hollow conductor. A special property of the TE11 mode is that its travel velocity propagates best in the hollow conductor, in comparison with the other, higher modes.

Especially presenting problems in process measurements technology is condensation and accretion of process media on the antenna, as a result of the temperature gradient in the process tank. Thus, condensate causes major attenuation of the high frequency, measuring signal, and, moreover, the radiation characteristic, or measuring properties, of the antenna is/are altered. In the case of fill level measurements in the sounding tube, or hollow conductor, higher modes of the high frequency, measuring signal are excited, which propagate with different group travel velocities in the hollow conductor. Due to the interference of the higher modes of the high frequency, measuring signal with the wanted signal, accuracy of measurement of the system is degraded.

Fundamentally, planar antennas are disadvantaged by the disturbance sensitivity of the measuring on the basis of condensate, in comparison to horn, and parabolic, antennas, since the radiation direction of the wave is usually perpendicular to the plane, in which the antenna is oriented. For this reason, the surface of the planar antenna is orthogonal to the gravitational field of the earth, or parallel to the surface of the fill substance of the medium. The volatile components of the fill substance to be measured condense on the cold surface of the planar antenna, whereby drops form, which then only drop off after reaching a certain size, when the surface tension is no longer sufficient to hold the drops. Since the condensation of the evaporating fill substance, or medium, on the planar radiating surface of the planar antenna cannot be prevented, it is attempted to improve, via a structural measure, the dropping off, and shedding, behavior of the condensate on the planar antenna. Such an embodiment of an adapted planar antenna is described in U.S. Pat. No. 6,684,697 B1, wherein the planar antenna is inclined at an angle to horizontal H. Through the inclined position, the force of gravity has also a force component parallel to the surface of the planar antenna, whereby the condensate, driven by this additional force component (normal force), runs together to form larger drops and, at a given position, drops off. The changing of the wavefront, or the radiation direction of the radiation lobe, by the inclined orientation of the planar antenna, is compensated by a different phase control of the rows of the antenna element. Furthermore, in U.S. Pat. No. 6,629,458 B1, an embodiment of a planar antenna is disclosed, in which a filled, hollow cone is placed in front of the planar antenna as antenna protection element, or a radome with a fill material of a dielectric, thermally insulating material is emplaced, which has the same effect, such as earlier described, that the condensate can drop off of the surface of the antenna. Such antenna protection elements in the form of membranes, lenses or cones, are also applied in the case of horn antennas and parabolic antennas for protecting the reflection surfaces of the antennas from condensate formation or deposits of medium.

Disadvantageous in the case of such antenna protection elements of the state of the art is that the antenna protection element, for preventing attenuation of the high frequency, measuring signal, can only be embodied with smallest height and slope possible. Due to the small slopes of the structures, the antenna protection element sheds the condensate only poorly. Furthermore, the antenna protection elements of the state of the art excite higher disturbance modes, whereby the measuring performance of the measuring device is lessened.

SUMMARY OF THE INVENTION

An object of the invention, therefore, is to provide an antenna protection element, which has minimal attenuation losses of the high frequency, measuring signals combined with a high disturbance mode suppression, while being simple and cost effective to manufacture.

This object is achieved according to the invention by forming the surface of the antenna protection element in the radiation direction according to at least one periodic, symmetric function, which is matched to the symmetry properties of the predetermined oscillatory mode of the high frequency signals. Through the matching of the periodic function of the surface structure of the antenna protection element to the symmetry characteristics of the desired mode of the high frequency, measuring signal, it is achieved, that disturbance modes are suppressed and, simultaneously, the shedding behavior of condensate from the surface of the antenna protection element is improved.

In an especially preferred form of embodiment of the invention, it is provided, that the antenna is embodied as a planar antenna, such as, for example, a printed, patch, and/or slit, antenna.

In an advantageous form of embodiment of the solution of the invention, it is proposed, that the bounded space is embodied as a waveguide, in which the antenna transmits and receives the high frequency signals.

A purpose supporting embodiment of the apparatus of the invention is that wherein a rotationally symmetric, periodic function is provided for the surface of the antenna protection element, when the transmitting and receiving of the high frequency signals to and from the antenna occurs in a round, hollow conductor as waveguide.

In an embodiment of the apparatus of the invention, it is provided, that a translationally symmetric, periodic function is provided for the surface of the antenna protection element, when the transmitting and receiving of the high frequency signals from and to the antenna occurs in a rectangular, hollow conductor as waveguide, or directly in free field.

In an especially preferred form of embodiment of the invention, it is provided, that the periodic, symmetric function surface of the antenna protection element has maxima and/or minima, which lie in a maximum plane directed orthogonally to the radiation direction and/or which lie in a minimum plane directed orthogonally to the radiation direction.

An advantageous embodiment of the solution of the invention provides, that the periodic, symmetric function for the surface of the antenna protection element has maxima and/or minima, which lie in a maximum plane rising or falling to at least one point of symmetry and/or which lie in a minimum plane rising or falling to at least one point of symmetry.

A preferred variant of the solution of the invention is that in which at least one triangle function, at least one sawtooth function and/or at least one rectangle function is provided as symmetric, periodic function for the surface of the antenna protection element.

An especially advantageous further development of the solution of the invention provides that at least one trigonometric, at least one parabolic and/or at least one hyperbolic function is provided as symmetric, periodic function for the surface of the antenna protection element.

In a useful embodiment of the apparatus of the invention, it is provided, that the antenna protection element is embodied as a single piece of dielectric material, especially polytetrafluoroethylene (PTFE).

A suitable embodiment of the apparatus of the invention is one in which the antenna protection element is embodied in the form of a plurality of parts of dielectric materials, such as e.g. a foundational body having a chemically resistant and/or antistatic coating of a material different from that of the foundational body. A layered construction of the antenna protection element in the form of a plurality of parts simplifies, for example, the manufacture of the surface structure of the antenna protection element according to more complex, periodically symmetric functions. Moreover, additional layers can be applied on the antenna protection element for reducing adhesive forces or for improving chemical resistance.

In an advantageous form of embodiment of the invention, it is provided, that the antenna protection element is embodied of a pressure resistant, thermally insulating material. Due to the thermally insulating action of the antenna protection element, it is prevented, that condensate can form on the surface, since, in this case, the process temperature and the surface temperature are equal. Through the stability under pressure of the dielectric material of the antenna protection element, it is assured, that, in the case of high pressure of some ten to hundred bar, the antenna protection element is not pressed in and/or deformed. This is especially to be heeded, when the antenna protection element does not lie planarly against the antenna structure, but, instead, closes it, such as, for example, in the case of a horn antenna or parabolic antenna, in the manner of a lid, and, thus, forms a hermetically closed, hollow space between the antenna structure and the antenna protection element.

In view of the earlier set forth features, the invention provides the following advantages and properties: Through this construction of the antenna structure, the arising, higher disturbance modes are suppressed; the wave resistance transition from the antenna to the antenna protection element and, from there, into the process space, is matched; and the antenna exhibits good shedding of condensate, whereby only low signal attenuation is detectable.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
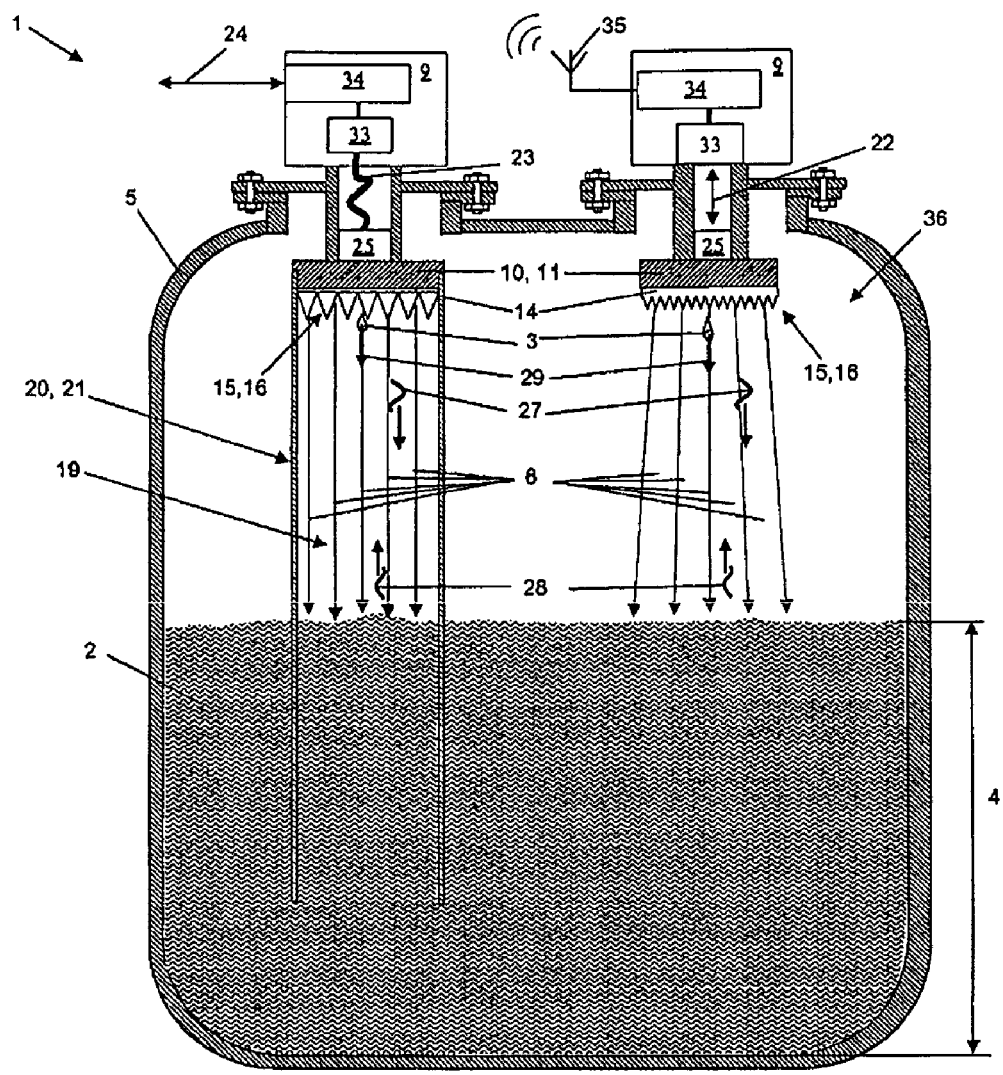
FIG. 1 is a schematic, total drawing of apparatuses mounted on a container for ascertaining and monitoring fill level of a medium in the container.

FIG. 1 shows two apparatuses 1 of the invention for ascertaining the fill level 4 of a medium 2 in a container 5. The form of embodiment of the apparatus 1 on the right is placed directly on the container 5 via a nozzle, or hatch, such that its antenna 10 freely radiates the high frequency signals 6 in the form of a linearly polarized wave with a lobe shaped radiation characteristic in the orthogonal radiation direction 26 toward the upper surface of the medium in the process space 36. In contrast, the form of embodiment of the apparatus 1 on the left is placed on the container 5 via a nozzle, or hatch, such that its antenna 10, or the exciting structure with the waveguide 20 secured thereto, excites the high frequency signals 6 in a waveguide mode, e.g. in the form of rotationally symmetric mode TE01, in a round, hollow conductor 21, into the bounded space 19.

The high frequency signals 6 are produced in the transmitting/receiving unit 33 of the measurement transmitter and forwarded, via the coaxial line 23, or via a hollow conductor 22 for the signal, by means of the supply network 25, to the emitting, antenna elements of the planar antenna 10, 11. The high frequency signals 6 are transmitted from the planar antenna 10, 11 as transmission signal 27 into the process space 36 or into a bounded space 19, which, for example, is embodied as waveguide 20. A form of embodiment of a waveguide 20 is, for example, an unfilled, round, hollow conductor 21, or a round, hollow conductor 21 filled, at least partially, with a dielectric material transmissive for microwaves. The planar antenna 11 and the antenna protection element 14, or the radome, are, according to the invention, so matched to one another, that, during the transition of the high frequency signal 6 from the planar antenna 11 into the round, hollow conductor 21, only the therein desired mode, e.g. TE01, of the high frequency, measuring signal 6 is produced. The exciting of higher disturbance modes 8, which are also capable of propagation in the round, hollow conductor 21, is prevented, or suppressed, by this type of embodiment of the antenna protection element 14.

For the case of free radiating of the high frequency signals 6 into the process space 36, the planar antenna 11 and the antenna protection element 14 are, according to the invention, so matched to one another, that the radiation characteristic of the antenna is essentially not influenced thereby. The transmitted high frequency signal 27 is reflected from the bounding surface of the medium 2, received back by the planar antenna 11 and conducted back to the transmitting/receiving unit 33, in which the received high frequency signals 6 are electronically preprocessed. The received high frequency signals 6 are, for example, converted in the transmitting/receiving unit 33, via sequential sampling with two slightly phase shifted, high frequency, pulse sequences, into a time expanded, lower frequency, intermediate frequency signal. The reflection signal 28, mixed down in this way, can then be evaluated in the low frequency portion of the control/evaluation unit 34 and the travel time, or traveled distance, of the transmitted high frequency signal 6 ascertained. Furthermore, the control/evaluation unit 34 performs communication tasks via a fieldbus or a two wire line 24 with a, for example, remote, control station or other field device. The data transmission, or communication, via the fieldbus 24 occurs, for example, according to the CAN, HART, PROFIBUS DP, PROFIBUS FMS, PROFIBUS PA, or FOUNDATION FIELDBUS standard. Furthermore, it is possible, such as shown in the example of an embodiment of the apparatus 1 on the left in FIG. 1, to perform the communication via a wireless interface 35 according to one of the known communication standards, such as e.g. ZigBee, Bluetooth, WLAN.

Through the particular forming of the antenna protection element 14 of the planar antenna 11, minima 18 and/or maxima are provided on the surface 15 according to the periodically symmetric function 16. By the force of gravity 29 counteracting the adhesive force; the condensate 3 forming as drops runs together and drops (at a shedding edge or a shedding point, such as, for example, a maxima 17 of the periodic function 16 of the surface 15) off of the surface 15 of the antenna protection element 14.

Figure 2:
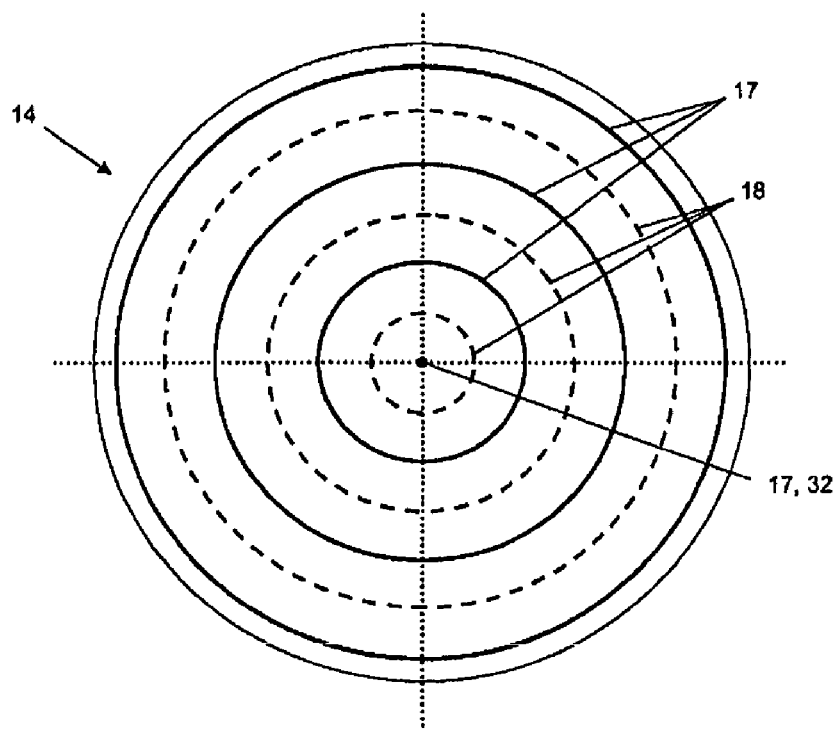
FIG. 2 is a schematic drawing in plan view of a first example of an embodiment of a rotationally symmetric, antenna protection element.
Figure 3:
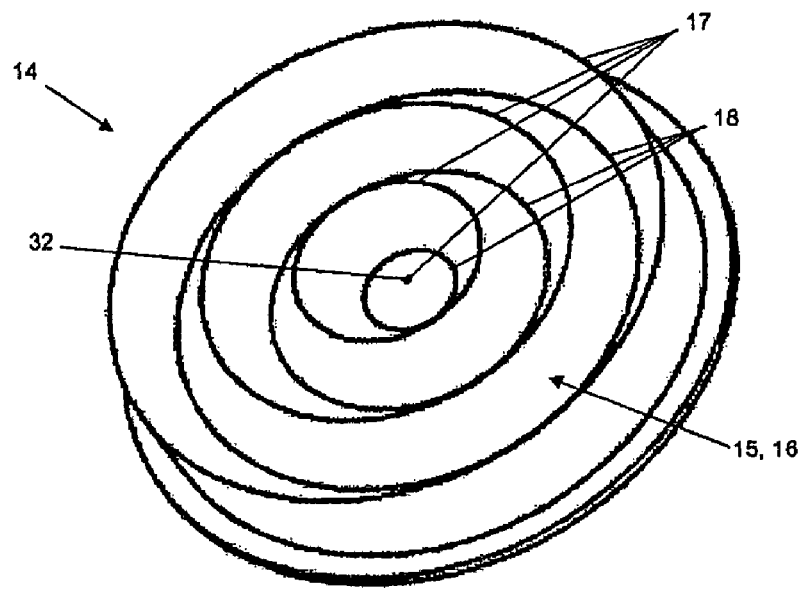
FIG. 3 is a perspective drawing of a first example of an embodiment of the rotationally symmetric, antenna protection element of FIG. 2.

FIG. 2 shows a plan view and FIG. 3 a perspective view of a rotationally symmetric, antenna protection element 14 according to a first example of an embodiment. The surface 15 of the antenna protection element 14 is formed according to a periodic function 16, wherein maxima 17 and minima 18 are arranged on concentric circles about a point of symmetry, or a symmetry axis, 32.

Figure 5:
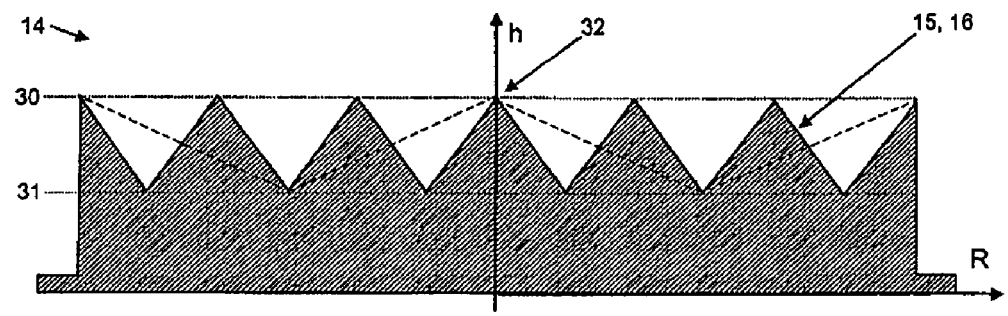
FIG. 5 is a schematic drawing of a first cross section of the first or second example of an embodiment of the antenna protection element in the case of a triangle function.
Figure 6:
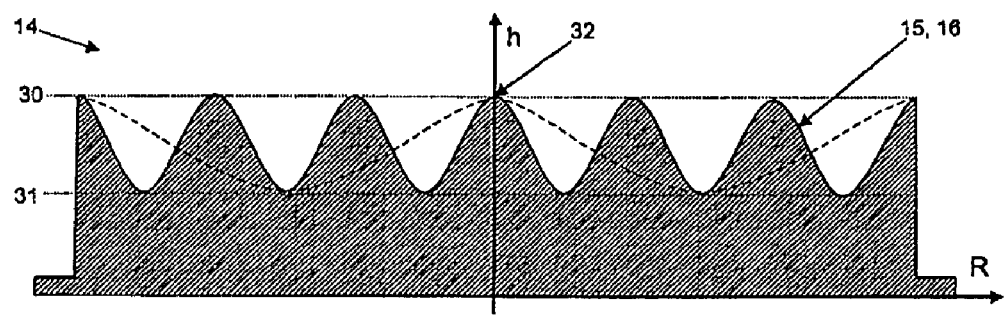
FIG. 6 is a schematic drawing of a second cross section of the first or second example of an embodiment of the antenna protection element in the case of a trigonometric function.

Cross sections according to the theme of the first example of an embodiment are shown in FIGS. 5 and 6. Measured on the abscissa axis of the supplied coordinate system from the symmetry axis 32 is the radius R and on the ordinate axis the height h of the antenna protection element 14. In FIG. 5, the surface 15 of the antenna protection element 14 is formed according to a periodic, triangle function 16 of periods N=3. In FIG. 6, the surface 15 of the antenna protection element 14 is formed according to a periodic, sine function 16 of periods N=3. Other functions for the structure of the surface 15 of the antenna protection element 14 with periods N=1 are indicated as dashed lines in FIGS. 5 and 6. However, also all other trigonometric and hyperbolic functions 16 are options for the structure of the surface 15. The maxima 17 of the periodic function 16 lie all on a maximum plane 30 and the minima 18 lie all on a minimum plane 31. These planes 30, 31 are parallel to one another in FIGS. 5, 6 and 8; however, it is also possible, that the maximum plane 30 and/or minimum plane 31 rises or falls in the direction of the symmetry axis 32, so that the maxima 17 and minima 18 of the periodic function 16 can also lie at different heights h. It is not explicitly shown in the figures, that the maxima 17 of the periodic function 16 can lie at different heights h and, thus, that the function 16 can have different amplitude heights.

The antenna protection element 14 of the invention, with the surface 15 formed according to the periodic, symmetric function 16, rests on the idea, that condensate 3 can drop by means of gravitation 29 off of a surface 15 subdivided into a number of smaller units having greater angles of inclination better than from one, all-encompassing, conical surface, and, therewith, the antenna 10 becomes more insensitive to the forming of condensate 3. A limiting condition to the execution of this idea is, naturally, that the HF behavior of the antenna 10, such as e.g. the radiation characteristic, echo losses and attenuation characteristics, must not degrade, but, instead, when possible, should even improve.

If one proceeds on the assumption, that the planar antenna 11, in the ideal case, excites the desired mode 7, the TE01 mode of the high frequency signal 6, then a transition from the antenna protection element 14 to the round, hollow conductor 21 is to be designed, which is suited both for the matching, as well as also for the suppressing of disturbance modes 8. A rotationally symmetric function 16 for the surface 15 of the antenna protection element 14, on the basis of the rotationally symmetric properties of the TE01 mode of the high frequency signal 6 in a round, hollow conductor 21, delivers very good results. Minimizing of reflection, suppressing of disturbance modes 8, and the desired shedding behavior of the condensate 3 are all achieved by the rotationally symmetric, periodic function 16 for the surface 15 of the antenna protection element 14. In order not mentionably to excite the reflected and transmitted disturbance modes 8 (TE0n for n>1) in a multimode, round, hollow conductor 21, the number of periods N out to the hollow conductor radius R must be so selected that $$2N-1 > n \quad \text{(Eq. 1)}$$

Here, n is the index of the highest TE0n mode, which, in this case, is still capable of propagation in the round, hollow conductor 21. After the number of periods is selected for the protective element, then any periodic function 16 can be applied. However, the triangle function 16 for the surface 15 of the antenna protection element 14 is simplest to implement from a manufacturing point of view and, moreover, the additional requirements, such as the minimizing of the reflection of the mode at the dielectric transition and the optimizing of the shedding behavior of condensate 3, are achievable by varying the height h of the periodic function 16.

Figure 4:
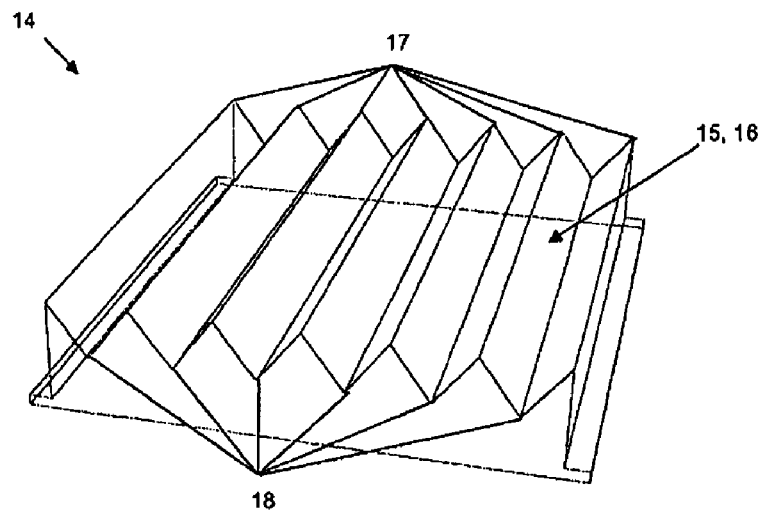
FIG. 4 is a perspective drawing of a second example of an embodiment of a translationally symmetric, antenna protection element.

FIG. 4 shows a perspective view of a second example of an embodiment of an antenna protection element 14 having a translationally symmetric function 16 for the surface 15. This type of translationally symmetric, antenna protection element 14 is matched to the linearly polarized wave of the free field antenna and also to antennas 10 or exciting structures, which work with linearly, or quasi linearly, polarized mode in a waveguide 20, e.g. TE10 mode in a rectangular, hollow conductor. The cross section of the translationally symmetric, antenna protection elements 14 can also look, for example, like the cross sections for the examples in FIGS. 5 and 6, as extended linearly in the third dimension.

Since the antenna protection elements 14 of the invention scarcely influence the radiative characteristics of the planar antenna 11, they can also be adaptable directly on present planar antennas 11.

Through the application of a chemically resistant fluoroplastic, such as e.g. perfluoroalkoxy copolymer (PFA), polytetrafluoroethylene (PTFE) and polyvinylidene fluoride (PVDF), it is possible to use the planar antenna 11 with the antenna protection element 14 in processes with aggressive media 2 at moderately high temperatures. Through a plasma surface treatment of the surface 15 of the antenna protection element 14 of a chemically resistant fluoroplastic, the shedding behavior of the condensate 3 of the surface 15 can be given an extra improvement, since the adhesive forces are lessened on the basis of the surface structure changed in the micrometer range by the plasma. Moreover, coatings of material transmissive for the high frequency measurement signal 6 are provided for improving antistatic properties, improving chemical and/or mechanical resistance and reducing the adhesive, or capillary, forces of the surface 15 of the antenna protection element 14. Furthermore, it is possible through a, for example, multilayer coating, or a multilayered construction, of the antenna protection element 14 further to optimize the reflection of the signal at the transition.

Figure 7:
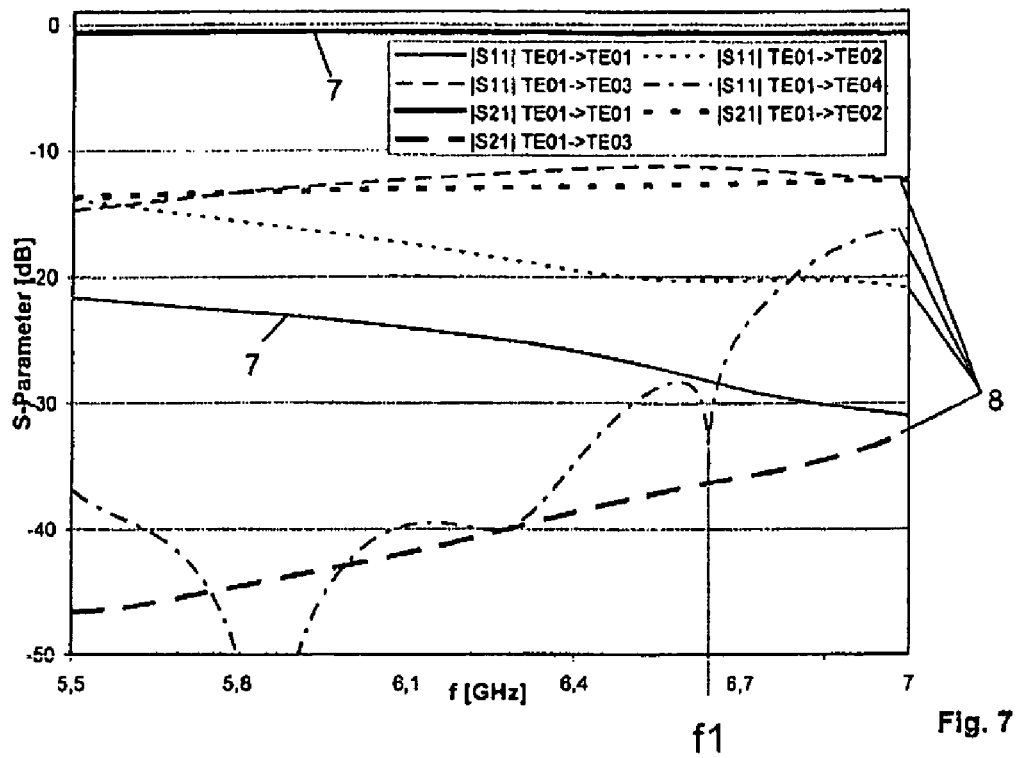
FIG. 7 is an attenuation diagram of a first example of an embodiment of a cone shaped, antenna protection element according to the state of the art.
Figure 8:
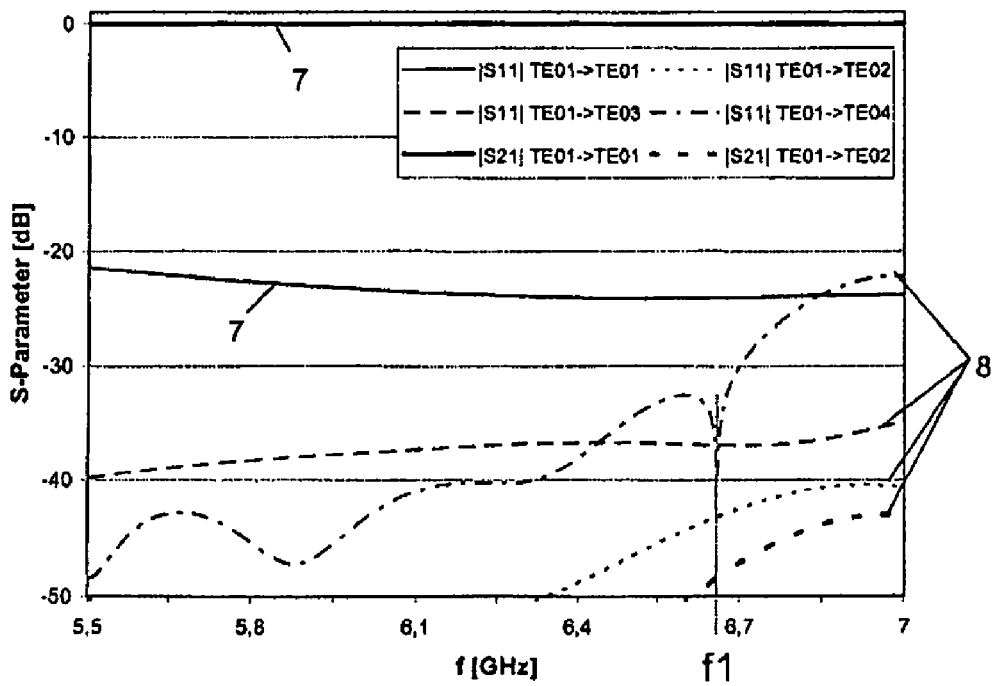
FIG. 8 is an attenuation diagram of the first example of an embodiment of the rotationally symmetric, antenna protection element of the invention.

FIGS. 7 and 8 present diagrams of the relevant S-parameters in different modes of the high frequency, measuring signal 6 at the transition from the antenna protection element 14 to a round, hollow conductor 21.

On the abscissa is measured the frequency f in $1*10^9$ Hertz and on the ordinate the S-parameter as attenuation in decibel.

In the high frequency range, it is no longer possible to ascertain impedances through simple voltage and electrical current measurements. For this reason, one ascertains at predetermined locations of the impedance the reflection, transmission and absorption of the high frequency, measuring signal 6 in amplitude and phase. For this, the S-parameters, or scattering parameters, of the transmission path are ascertained. The input reflection coefficient S11, as reflecting part of the high frequency, measuring signal 6 and the forwards transmission factor S21, as transmitting part of the high frequency, measuring signal 6 deliver, in such case, informative values concerning the transition of the high frequency signals 6 from the planar antenna 11 with the antenna protection element 14 to the waveguide 20.

FIG. 7 presents the S-parameters of the transition from a cone shaped, antenna protection element 14 having a triangle function 16 for the surface 15, which does not fulfill the condition (Eq. 1), a height h of 24 millimeter and a radius R of 66 millimeter, to a round, hollow conductor 21. Here, it is easy to see, that the disturbance modes 8 in this form of embodiment of the cone shaped, antenna protection element 14, such as, for example, the TE02 and TE03 modes, are only insignificantly suppressed in the transmitting and reflecting part of the high frequency, measuring signal 6. Above a limit frequency f1 of $6.6*10^9$ Hertz, the TE04 mode is still only slightly attenuated in the reflecting part of the high frequency, measuring signal 6.

FIG. 8 shows the S-parameters of the transition from the antenna protection element 14 of the invention with periods N=3 of the triangle function 16 for the surface 15, which fulfills the condition (Eq. 1), with a height h of 18 millimeter and with a radius R of 66 millimeter, to a round, hollow conductor 21. From this diagram, it is evident, that the transmission characteristics at the transition of the high frequency, measuring signals 6 from the planar antenna 11 to the round, hollow conductor 21 are improved through the matching of the antenna protection element 14 by means of a periodic symmetric function 16 of the invention for the surface structure 15. The disturbance modes 8 are more strongly suppressed, and, simultaneously, the part of the transmitted, desired mode 7 is increased—in the contrast to the results for a cone shaped, antenna protection element 14 illustrated in FIG. 7. Through the antenna protection element 14 of the invention, in the contrast to the cone shaped, antenna protection element 14, thus, the dynamics of the measuring was significantly improved.

Due to the flat form of embodiment of an antenna protection element 14 of the invention, it is, from the point of view of construction, especially suitable for planar antennas, such as printed patch, or slit, antenna structure.

This type of embodiment of the antenna protection elements 14 is also adaptable for classical horn and parabolic antennas, etc., which are, however, are not explicitly displayed here. A further advantage of the antenna protection element 14 of the invention is its solid construction, which, in comparison to the conventional, hollow, antenna protection construction, clearly permits higher mechanical pressure loading, thus permitting exposure to higher process pressure. This is, above all, necessary for stability under pressure in the case of antennas 10 with antenna protection elements 14 with hollow spaces, such as e.g. usual in the case of horn and parabolic antennas with antenna protection elements 14, in order to avoid penetration of medium 2 into this hollow space and/or a deformation of the antenna protection element 14.

The invention claimed is:

1. An apparatus for ascertaining and/or monitoring the fill level of a medium in a container, comprising:
    an antenna, which transmits and receives high frequency signals in a predetermined oscillatory mode in a bounded space in a predetermined radiation direction;
    an antenna protection element situated in front of said antenna in the radiation direction, said antenna protection element having a material transmissive to the high frequency signals, and a surface of which condensate of the medium runs, and/or drops, off; and
    a control/evaluation unit which evaluates received high frequency signals and ascertains fill level, wherein:
    in the radiation direction, said surface of the antenna protection element is formed according to at least one periodic, symmetric function, which is matched to symmetry properties of the predetermined oscillatory mode of the high frequency signals; and
    coating of material transmissive for the high frequency measurement signal are provided, for improving antistatic properties, improving chemical and/or mechanical resistance and reducing said adhesive, or capillary, forces of the surface of the antenna protection element.

2. The apparatus as claimed in claim 1, wherein:
    said antenna is embodied as a planar antenna.

3. The apparatus as claimed in claim 2, wherein:
    said planar antenna comprises one of: a printed, patch, or slit antenna.

4. The apparatus as claimed in claim 1, wherein:
    said bounded space is embodied as a waveguide, in which said antenna transmits and receives the high frequency signals.

5. The apparatus as claimed in claim 1, wherein:
    said periodic symmetric function is a rotationally symmetric, periodic function for said surface of said antenna protection element, when the transmitting and receiving of the high frequency signals of said antenna occurs in a round, hollow conductor as waveguide.

6. The apparatus as claimed in claim 1, wherein:
    said periodic symmetric function is a translationally symmetric, periodic function for said surface of said antenna protection element, when the transmitting and receiving of the high frequency signals of said antenna occurs in a rectangular, hollow conductor as waveguide or directly in free field.

7. The apparatus as claimed in claim 1, wherein:
    said periodic, symmetric function for said surface of said antenna protection element has a maxima and/or a minima, which lie in a maximum plane directed orthogonally to the radiation direction and/or in a minimum plane directed orthogonally to the radiation direction.

8. The apparatus as claimed in claim 1, wherein:
    said periodic, symmetric function for said surface of said antenna protection element has a maxima and/or a minima, which lie in a maximum plane rising or falling to at least one point of symmetry and/or in a minimum plane rising or falling to at least one point of symmetry.

9. The apparatus as claimed in claim 1, wherein:
    at least one triangle function, at least one sawtooth function and/or at least one rectangle function is provided as said symmetric, periodic function for said surface of said antenna protection element.

10. The apparatus as claimed in claim 1, wherein:
    at least one trigonometric, at least one parabolic and/or at least one hyperbolic function is provided as said symmetric, periodic function for said surface of said antenna protection element.

11. The apparatus as claimed in claim 1, wherein:
    said antenna protection element is embodied as a single piece of polytetrafluoroethylene (PTFE) dielectric material.

12. The apparatus as claimed in claim 11, wherein:
    said antenna protection element comprises a pressure resistant, thermally insulating material.

13. The apparatus as claimed in claim 1, wherein:
    said antenna protection element is embodied in the form of a plurality of parts of dielectric material.

14. The apparatus as claimed in claim 1, wherein:
    a multilayer coating, or a multilayered construction, of the antenna protection element further to optimize the reflection of the signal at the transition.

* * * * *